US009831629B2

(12) United States Patent
Busch et al.

(10) Patent No.: US 9,831,629 B2
(45) Date of Patent: Nov. 28, 2017

(54) COMPACT HYBRID LASER ROD AND LASER SYSTEM

(71) Applicant: The United States of America as represented by the Administrator of the National Aeronautics and Space Administration, Washington, DC (US)

(72) Inventors: George E. Busch, Newport News, VA (US); Farzin Amzajerdian, Yorktown, VA (US); Diego F. Pierrottet, Poquoson, VA (US)

(73) Assignee: THE UNITED STATES OF AMERICA AS REPRESENTED BY THE ADMINISTRATOR OF THE NASA, Washington, DC (US)

( * ) Notice: Subject to any disclaimer, the term of this patent is extended or adjusted under 35 U.S.C. 154(b) by 0 days.

(21) Appl. No.: 15/382,852

(22) Filed: Dec. 19, 2016

(65) Prior Publication Data

US 2017/0187159 A1   Jun. 29, 2017

Related U.S. Application Data

(60) Provisional application No. 62/271,453, filed on Dec. 28, 2015.

(51) Int. Cl.
*H01S 3/30* (2006.01)
*H01S 3/067* (2006.01)
(Continued)

(52) U.S. Cl.
CPC ...... *H01S 3/06708* (2013.01); *H01S 3/06733* (2013.01); *H01S 3/06754* (2013.01);
(Continued)

(58) Field of Classification Search
CPC ............ H01S 3/06708; H01S 3/06733; H01S 3/094003; H01S 3/0941; H01S 3/1603;
(Continued)

(56) References Cited

U.S. PATENT DOCUMENTS

2002/0159736 A1* 10/2002 Dejneka ............. H01S 3/06716
385/127
2003/0063629 A1* 4/2003 Davis ..................... H01S 3/063
372/6
(Continued)

OTHER PUBLICATIONS

Amzajerdian, Farzin et al., "Doppler Lidar Sensor for Precision Landing on the Moon and Mars," IEEE, 2012, pp. 1-7.
(Continued)

*Primary Examiner* — Kinam Park
(74) *Attorney, Agent, or Firm* — Jonathan B. Soike; Andrea Z. Warmbier; Mark P. Dvorscak (57) ABSTRACT

A hybrid fiber rod includes a fiber core and inner and outer cladding layers. The core is doped with an active element. The inner cladding layer surrounds the core, and has a refractive index substantially equal to that of the core. The outer cladding layer surrounds the inner cladding layer, and has a refractive index less than that of the core and inner cladding layer. The core length is about 30 to 2000 times the core diameter. A hybrid fiber rod laser system includes an oscillator laser, modulating device, the rod, and pump laser diode(s) energizing the rod from opposite ends. The rod acts as a waveguide for pump radiation but allows for free-space propagation of laser radiation. The rod may be used in a laser resonator. The core length is less than about twice the Rayleigh range. Degradation from single-mode to multi-mode beam propagation is thus avoided.

20 Claims, 2 Drawing Sheets

(51) Int. Cl.
*H01S 3/0941* (2006.01)
*H01S 3/094* (2006.01)
*H01S 3/16* (2006.01)

(52) U.S. Cl.
CPC ...... *H01S 3/0941* (2013.01); *H01S 3/094003* (2013.01); *H01S 3/1603* (2013.01); *H01S 3/161* (2013.01); *H01S 3/1608* (2013.01); *H01S 3/1611* (2013.01)

(58) Field of Classification Search
CPC ...... H01S 3/1608; H01S 3/161; H01S 3/1611; H01S 3/06754
See application file for complete search history.

(56) References Cited

U.S. PATENT DOCUMENTS

| | | |
|---|---|---|
| 2014/0334830 A1 | 11/2014 | Pierrottet et al. |
| 2015/0104193 A1 | 4/2015 | Pierrottet et al. |
| 2016/0231585 A1* | 8/2016 | Bauco .................. G02B 5/0242 |

OTHER PUBLICATIONS

Geng, Jihong et al., "Single-Frequency Narrow-Linewidth Tin-Doped Fiber Laser Using Silicate Glass Fiber," Optics Letters, Nov. 15, 2009, pp. 3493-3495, vol. 34, No. 22.

* cited by examiner

_Fig-2_

_Fig-3_

_Fig-4_

COMPACT HYBRID LASER ROD AND LASER SYSTEM

CROSS-REFERENCE TO RELATED PATENT APPLICATION(S)

This patent application claims the benefit of and priority to U.S. Provisional Patent Application No. 62/271,453, filed on Dec. 28, 2015, the contents of which are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C, §202) and may be manufactured and used by or for the Government for governmental purposes without the payment of any royalties thereon or therefore. In accordance with 35 U.S.C. §202, the contractor elected not to retain title.

BACKGROUND OF THE INVENTION

Lasers emit concentrated light via the optical amplification and stimulated emission of electromagnetic radiation, which in turn occurs through an application-specific laser gain medium. The light from ordinary light sources, such as the sun or an incandescent light bulb, is spread over a broad band of wavelengths. In contrast, laser light is usually contained within a very narrow wavelength band, and is often described as being monochromatic. Additionally, the light is emitted in phase and thus is highly coherent. Laser light beams are also collimated rather than spreading out in all directions in the manner of ordinary light. Because laser light is monochromatic, coherent, and collimated, an emitted laser beam may be used to irradiate a very small area and thus achieve very high power densities even with moderate overall power levels. Generally, single-mode/wavelength lasers have higher quality output with lower divergence, more uniform spatial beam profile, and more pure spectral content than multi-mode/wavelength lasers. However, generating high peak power single-mode laser beams is significantly more challenging than generating multi mode laser beams due to a number of non-linear effects occurring in the laser gain media.

A laser cavity or resonator lies at the heart of a laser device. A suitable laser gain medium such as a rare earth active crystal, a gas, or a semiconductor material is enclosed and positioned along the optical axis of the resonator. Mirrors may be disposed a distance apart from each other, with one mirror being a total reflector and the other a partial reflector. As light reflects between the mirrors, the light gains in intensity with each reflected pass through the laser gain medium. Some light escapes through the partial reflector, also referred to as an output coupler, with the escaping light forming the emitted laser beam that ultimately propagates along the optical axis.

The laser gain medium may be a solid, gas, or liquid, with continuous wave (CW) and pulsed lasers commonly used in commercial and scientific research applications. CW lasers in particular produce an uninterrupted beam of light with a stable but relatively low peak output power. Pulsed lasers are able to sustain laser action over brief intervals, even down to pulse lengths of one nanosecond or less. Because pulsed lasers can release significant amounts of stored energy in these pulses, each pulse can have a high peak power level often ranging from several kilowatts to multiple megawatts. In contrast, the peak power of a CW single-mode laser is ordinarily limited to no more than a few hundred watts.

Solid-state lasers use laser gain material in the form of a solid active matrix, such as a ruby crystal or another active element, e.g., neodymium: yttrium-aluminum garnet ("YAG"). Such lasers, while capable of outputting the high peak power levels noted above, are relatively inefficient and usually insufficiently coherent for performing certain precision tasks. A solid-state laser diode is an example of efficient, small, low-power laser devices which can be scaled to high power by combining them into compact multi-diode packages. While the divergence and coherence degrades as the result of the combining, these devices have high utility as a pump sources to excite other laser gain media. The guiding of pump beams at the cladding-to-cladding interface in the hybrid fiber rod is a means to mitigate the high divergence of high power diode pump lasers. Another important type of laser is the fiber laser, with gain media composed of extended lengths of doped optical fiber. Conventional fiber lasers typically have fiber gain lengths of one or more meters, and core diameters on the order of less than 10-20 microns for single-mode operation and around 100 microns for multi-mode operation. Light passing along the extended fiber length is internally amplified and emitted in an efficient and highly coherent manner, but due to fiber structural limitations posed by small core cross-sectional area and long lengths, the resulting high peak power densities of emitted light within the core limits the overall peak power to a correspondingly low level relative to solid-state lasers.

The most highly limiting process in fiber lasers is usually Stimulated Brillouin Scattering (SBS), which can not only severely degrade beam propagation, but can even produce catastrophic material damage to the fiber. The threshold power ($P_{th,SBS}$) at which SBS reaches debilitating levels in dielectric materials, including optical fibers and hybrid fiber rods, scales with the quantity $d^2/L$. Thus the small core diameters (d) and long fiber lengths (L) of conventional fiber lasers means that SBS becomes a threat at very low power threshold levels. Much higher power levels can be reached (before SBS becomes a problem) with the larger core diameters and shorter length gain media of the subject hybrid fiber rods.

Currently, there are many Earth-based and planetary mission-based measurements that cannot be performed due to size, mass, power, and thermal concerns from the required laser transmitter. Such missions include ASCENDS ("Active Sensing of CO2 Emissions over Nights, Days, and Seasons"), 3-D Winds missions studying tropospheric wind conditions using space-based laser systems, ozone detection missions, EDL ("Entry, Descent, and Landing") missions for the exploration of Mars and other celestial bodies, Automatic Rendezvous and Docking, and space communications. Such missions would benefit from an increase in available laser efficiency and output power, along with corresponding decreases in the mass and size of the laser device. There are also many aircraft applications such as air data (air speed and direction) measurements and detection of clear air turbulence and wind shears that also require lasers of small size. Therefore, there remains a need for a compact, low mass/high-energy laser system for use in the types of specialized applications noted above.

BRIEF SUMMARY OF THE INVENTION

A free-space hybrid fiber rod is disclosed herein for use in laser applications of the types noted generally above. The hybrid fiber rod combines the size, high peak power, and other advantages of solid-state lasers with the high efficiency characteristics of a fiber laser, and thus is described herein as a "hybrid" fiber rod. The present disclosure is intended as a solution to the myriad challenges facing laser-based instrumentation for aviation, space, and other mission-based specialized applications that may be technically and programmatically challenging to implement due to size, power consumption, complexity, and cost considerations.

For example, existing and proposed sensors employ laser spectrometers to measure parameters of the atmospheres and surface of the Earth as well as surrounding planets and other celestial bodies. The superior optical qualities of a laser beam enables more accurate remote sensing measurements to be performed with higher resolutions and at greater distances than is otherwise possible using active radar and passive optical instruments that lasers tend to replace. Many applications would benefit from increases in efficiency, reliability, and available laser power, with the corresponding decrease in mass that is necessary to incorporate and operate such lasers on sensor platforms.

The present approach thus provides a novel hybrid fiber rod that may function as either a laser or a laser amplifier, with an architecture that retains the high efficiency and beam quality of fiber lasers, but that also increases the pulse energy and peak power output by up to two orders of magnitude. Pulse energies are able to be increased from their present levels of less than 100 microjoules, to over tens of millijoules at a single frequency. Achieving the superb attributes of tunable laser beams at increasingly high power levels, while meeting the stringent mass, power, and reliability for deployment to space and other operating environments, presents challenges that are not presently met by many solid-state lasers. Hybrid fiber rod lasers may provide the solution to those challenges.

In a particular embodiment, the hybrid fiber rod includes a cylindrical silicate fiber core doped with an active element and having a first refractive index, which is determined by material and wavelength requirements. The fiber rod also includes inner and outer cladding layers coaxial with and surrounding the fiber core. The inner cladding layer has a second refractive index that is substantially equal to the first refractive index. The outer cladding layer, which is coaxial with and surrounds the inner cladding layer, has a refractive index that is less than the first and second refractive indexes.

The length of the fiber core may be about 30 to 2000 times larger than the diameter of the fiber core in some embodiments. Where system requirements permit, the length of the fiber core/rod is kept relatively short, e.g., 0.1 m consistent with the nonlinear power constraints described herein. However, for larger core diameters approaching 1000 μm, hybrid fiber rod lengths could approach about 0.5 m. in all cases the length of the fiber rod would be subject to the constraints presented herein.

A hybrid fiber rod laser system is also disclosed. The system may include a master oscillator laser, a modulating device, the hybrid fiber rod noted above, and a pair of pump laser diodes. The master oscillator laser is configured to generate an input laser beam along an optical axis. The modulating device, which is positioned along the optical axis, is configured to receive and modulate a frequency, wavelength, or amplitude of the input laser beam, and thereby output a modulated laser beam. The pump laser diodes are configured to energize the hybrid fiber rod from opposite ends of the fiber rod with a calibrated wavelength of light.

According to another example embodiment, the hybrid fiber rod may include a silicate fiber core doped with an active or rare-earth element in the form of, e.g., Neodymium, Erbium, or Holmium in three application-specific single-mode embodiments, with a doping concentration of about 0.5 to 10 percent by weight of the fiber core. The fiber core has a first refractive index, a length in this particular embodiment of between 0.03 meter (m) and 0.5 m, and a diameter of between 100 micrometers (μm) and 1000 μm. The fiber rod also includes an undoped inner cladding layer arranged coaxially with and surrounding the fiber core, with the inner cladding layer having an outer diameter of about 130 to 170 percent of the diameter of the fiber core, and having a second refractive index that is substantially equal to the first refractive index. An outer cladding layer of the fiber rod is arranged coaxially with and surrounding the inner cladding layer. The outer cladding layer has a refractive index that is less than the first and second refractive indexes, e.g., no more than about 95 percent of the first and second refractive indexes.

These and other features, advantages, and objects of the present disclosure will be further understood and appreciated by those skilled in the art by reference to the following specification, claims, and appended drawings. The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION OF THE INVENTION

Figure 1:
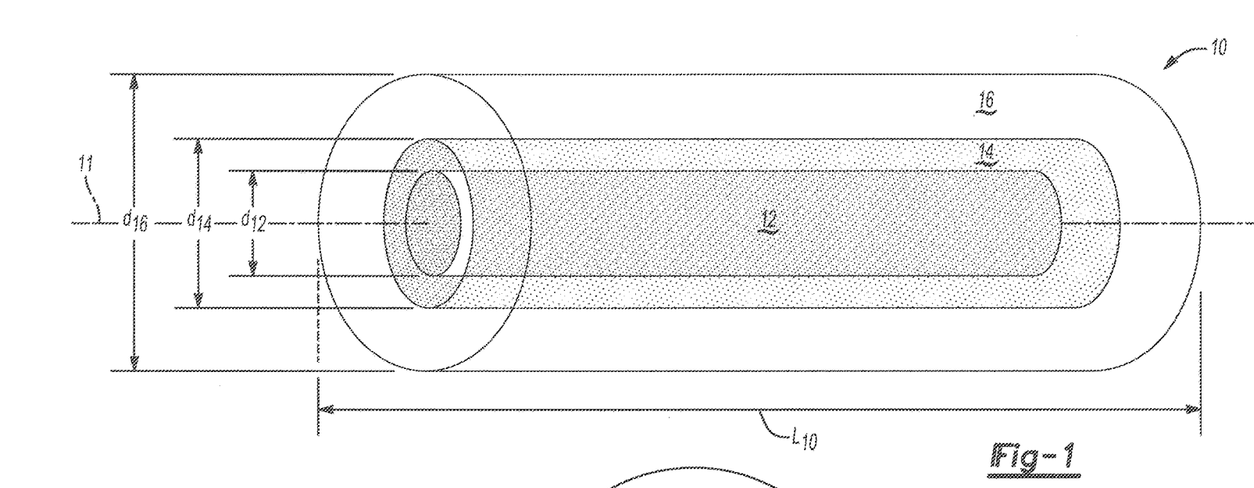
FIG. 1 is a schematic illustration of a hybrid fiber rod as disclosed herein.

For purposes of description herein, the terms "upper," "lower," "right," "left," "rear," "front," "vertical," "horizontal," and derivatives thereof shall relate to orientation shown in FIG. 1. However, it is to be understood that various alternative orientations and step sequences may be envisioned, except where expressly specified to the contrary. Also for purposes of the present detailed description, words of approximation such as "about," "almost," "substantially," "approximately," and the like, may be used herein in, the sense of "at, near, or nearly at," or "within 3-5% of," or "within acceptable manufacturing tolerances," or any logical combination thereof. It is also to be understood that the specific devices and processes illustrated in the attached drawings, and described in the following specification, are exemplary embodiments of the inventive concepts defined in the appended claims. Hence, specific dimensions and other physical characteristics relating to the embodiments disclosed herein are not to be considered as limiting, unless the claims expressly state otherwise.

As shown in FIG. 1, with the various Figures being schematic and not necessarily to scale in terms of size or relative positioning unless specifically noted, a hybrid fiber rod 10 includes a fiber core 12, an inner cladding layer 14 surrounding the fiber core 12, and an outer cladding layer 16 surrounding the inner cladding layer 14. While shown as cylindrical in a typical configuration, the shape may be rectangular, hexagonal, or other suitable shapes in other embodiments. The hybrid fiber rod 10 has an optical axis 11, with the fiber core 12, the inner cladding layer 14, and the outer cladding layer 16 being coaxially arranged with respect to each other along the optical axis 11, such that the terms "inner" and "outer" respectively refer to closer and farther relative proximity to the optical axis 11. When used in the example laser system 50 of FIGS. 2 and 3, the optical axis 11 serves as the axis of propagation of an emitted laser beam, and thus forms a laser axis.

The fiber rod 10 has an axial length ($L_{10}$) and a core diameter ($d_{12}$). The length ($L_{10}$) is substantially shorter and the core diameter ($d_{12}$) is substantially larger than the respective length and core diameter of a conventional fiber laser, with example dimensional ranges and size ratios set forth below. The fiber core 12 is doped with a wavelength-specific active element and configured for use as a free-space laser gain medium. The present disclosure is thus intended to help overcome the problem of low optical damage thresholds and nonlinear loss processes that occur in single-mode fiber lasers having conventional core diameters on the order of 8 or 9 microns or micrometers (μm) and lengths of over 1 m.

The use of the fiber core 12 of FIG. 1 with its correspondingly large core diameter, which is on the order of 20-80 times that of a conventional fiber core diameter, permits the peak power generated by the hybrid fiber rod 10 to be increased by a factor of 10,000 or more, thus greatly expanding the range of possible beneficial applications. Moreover, the degradation from single-mode to multi-mode propagation that ordinarily occurs in larger diameter conventional fiber lasers is avoided by limiting the length ($L_{10}$) to no more than twice the Rayleigh range as described below, which is typically less than 10 percent of the length of a conventional 1 m-long length of fiber for a typical fiber laser. Such extended lengths are needed in conventional fiber lasers in order to provide very high optical gains and high efficiency. Thus, the substantially smaller lengths and larger core diameters set forth herein, are a notable departure from the construction of conventional fiber lasers and fiber amplifiers.

The fiber core 12 may be constructed of a high-purity silicate and doped with an application-suitable rare-earth active element providing a desired wavelength. In a particular set of non-limiting embodiments in which a single-mode wavelength of 1 to 2 μm is desired, the active element may be Neodymium for a wavelength of 1 μm, Erbium for a wavelength of 1.5 μm, or Holmium for a wavelength of 2 μm, with typical doping concentrations of about 0.5 to 10 percent by weight of the fiber core 12. Other rare earth active elements such as thulium or ytterbium may be envisioned in alternative embodiments without departing from the intended scope of the disclosure.

The inner cladding layer 14 of FIG. 1, which is coaxial with and surrounds the fiber core 12, may be constructed of a specialized silicate or other appropriate substrate material, with a refractive index (n14) that is substantially equal to a refractive index ($n_{12}$) of the fiber core (12), i.e., $n_{12} \cong n_{14}$ As will be appreciated by those of ordinary skill in the art, a refractive index (or index of refraction) of a given medium is a unitless value calculated from the ratio of the speed of light in a vacuum to that in the medium, i.e., the specific materials of the fiber core 12 and inner cladding layer 14 in this instance. Ideally, the refractive indexes $n_{12}$ and $n_{14}$ are exactly equal. However, in practice the values are considered to be "substantially equal" if $n_{14}$ is greater than n12, in order to be non-guiding, but not more than 5 percent greater than $n_{12}$, in order to not produce substantial Fresnel reflection at the interface. The exact refractive index chosen for the fiber core 12 and inner cladding layer 14 will depend on the particular application.

Figure 1A:
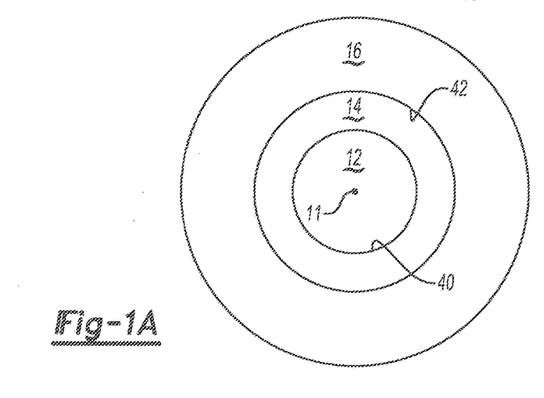
FIG. 1A is a schematic end view illustration of the hybrid fiber rod shown in FIG.

The outer cladding layer 16, which may be constructed of silica, is coaxial with and surrounds the inner cladding layer 14, with the inner cladding layer 14 being immediately adjacent to the outer cladding layer 16 and sharing a cladding-to-cladding interface 40 as shown in FIG. 1A. The outer cladding layer 16 has a refractive index that is less than that of each of the first and second refractive index, for instance at least 6 to 8 percent less than the first and second refractive indexes. The interface between the outer cladding layer 16 and the inner cladding layer 14 acts as a waveguide, and thus the difference between a refractive index $n_{16}$ and the refractive index $n_{14}$, or more precisely the difference in the squares thereof, can be selected to tune the performance of the laser rod 10 for a given application. The outer cladding layer 16 also serves as a structural component configured to reinforce and protect the fiber core 12 and the inner cladding layer 14.

A ratio of the length ($L_{10}$) of the hybrid fiber rod 10 and fiber core 12 to the diameter ($d_{12}$) of the fiber core 12, i.e., $$\frac{L_{10}}{d_{12}},$$

may be in the range of about 30 to 1000, or within a narrower range of 30 to 300 in another embodiment. The fiber core 12 is constructed within such ratio ranges to ensure a balance between the high relative efficiencies available via conventional fiber lasers and the high peak power levels associated with solid-state lasers, with the dimensional parameters being such that damage to and non-linear effects within the fiber core 12 are largely avoided. The laser rod 10 of FIG. 1 is thus treated as if it were a bulk solid-state laser, albeit one in which pumped light is efficiently trapped, confined, and propagated within the fiber core 12 and the inner cladding layer 14, and along the optical axis 11.

In various embodiments, the fiber rod 10 may have a length ($L_{10}$) of less than about 0.1 meter (m) and a diameter ($d_{12}$) that is greater than about 100 μm. For instance, the diameter ($d_{12}$) of the fiber core 12 may be less than about 1000 μm (1 mm), such as 0.5 mm in a particular configuration. Such a diameter is significantly larger than the 8-9 µl in a diameters used in conventional single-mode fiber lasers. The length ($L_{10}$) of the fiber rod 10 may be in a range of about 0.03 in to 0.5 m, or only about 3-25 percent of the length of a conventional 1-2 m long fiber laser. With respect to the outer diameters ($d_{14}$) and ($d_{16}$) of the respective inner and outer cladding layers 14 and 16, the outer diameter ($d_{14}$) of the inner cladding layer 14 may be about 150% of the outer diameter ($d_{12}$) of the fiber core 12, In some embodiments, the outer diameter $d_{14}$ may encompass a range of 130 to 200 percent of the diameter $d_{12}$ of the fiber core 12. Similarly, the outer diameter ($d_{16}$) of the outer cladding layer 16 may be at least 150% of the outer diameter ($d_{14}$) of the inner cladding layer 14.

Figure 2:
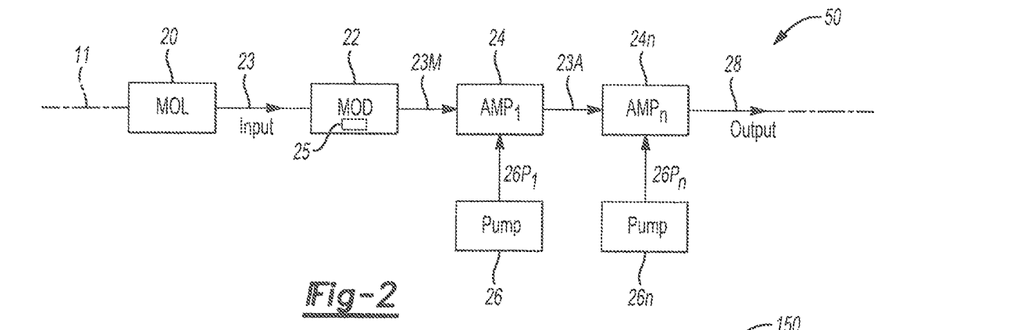
FIG. 2 is a schematic illustration of an example laser system using the hybrid fiber rod amplifier shown in FIG. 3.

Referring to FIG. 2, an example hybrid fiber laser system 50 is depicted in schematic block diagram form as having a low-power master oscillator laser (MOL) device 20, a modulating device (MOD) 22, laser amplifier devices 24A and/or 24B labeled AMP1 and AMP(n), and one or more low-power pump modules 26A and/or 26n, e.g., laser diodes. The master oscillator laser device 20 is configured to generate an input laser beam (arrow 23) along the optical axis 11. The modulating laser device 22 is positioned along the axis 11 and is configured to modulate the input laser beam (arrow 23) using a modulation circuit 25 and associated modulation software, as needed, and output a modulated laser beam (arrow 23M). The laser amplifier device(s) 24A and/or 24B, or one or more additional laser amplifier devices (not shown) depending on the output power requirement, are positioned along the axis 11 and configured to receive and amplify the modulated laser beam (arrow 23M), thereby forming an amplified beam (arrow 23A). After one or more stages of amplification, an output beam 28 is generated, with the output beam 28 labeled "output" in FIG. 2. The example configuration of FIG. 1 thus provides a highly efficient modular design offering distinct building blocks for use in different applications with different sets of laser output requirements.

With respect to the master oscillator laser device 20, this particular device may be configured as a low-power laser device of a desired frequency and wavelength, for instance an off-the-shelf 1-inch 14-pin "butterfly package" laser diode, a chip on submount (COS), TO-can, C-mount, or other relatively low cost, low-power laser device. The modulating device 22 is positioned downstream of the master oscillator laser device 20 and is configured to modulate a frequency, wavelength, or amplitude of the received input laser beam (arrow 23), such as via pulse width modulation or waveform modulation, to generate a modulated laser beam (arrow 23) in any form required for the application. For example, the modulating device 22 can chop the input laser beam (arrow 23) into discrete pulses or may use a RF (radio frequency) signal to shift the frequency of the MOL output for downstream amplification via the amplifier laser devices 24A and/or 24B. In this way, the wavelength of the laser signal to be amplified can be tuned to the single-mode wavelength of the desired application. The modulating device 22 can also be used to chirp the frequency or wavelength of the MOL output. Amplified frequency-chirped laser radiation has several remote sensing applications. Such laser system can be used as a communication transmitter for which the modulator is used for encoding the data or signal to be transmitted.

The modulating device 22 may be embodied, by way of example, as any electro-optic modulator of the type used extensively in the telecommunication industry. As is known in the art, modulating devices or modulators are configured to modulate the amplitude, phase, or frequency of a laser beam, e.g., by modulating any of these values linearly with respect to time to create a sawtooth, waveform, or other pattern. As the modulating device 22 may be used to modulate the frequency or wavelength of the laser, it is possible to tune the frequency or wavelength of the laser for a given application. This capability is particularly useful in applications such as measurement of molecular constituents, as a given molecule has distinct absorption signature as function of frequency. By tuning the laser frequency, a molecule of interest can be detected or its concentration measured. For example, the hybrid fiber rod 10 of FIG. 1 in the hybrid fiber laser system 50 of FIG, 2 can be used to measure the carbon dioxide concentration in the atmosphere. The modulating device 22 can also "chirp" the calibrated laser frequency, which is useful for a number of applications, one of which is the precision measurement of range and velocity, The laser amplifier device(s) 24A and/or 24B utilize the hybrid fiber rod 10 of FIG. 1 in the embodiment of FIG. 2. Pump modules 26A and 26n may be embodied as pump diodes, e.g., 1.5 µm or 1.9 µm fiber-coupled laser diodes, and used for in-band pumping in which the wavelength of the pump laser is closely matched, i.e., is substantially equal to, the laser wavelength of the hybrid laser rod 10. Commercially available 0.98 µm diodes may be used as cost-efficient alternatives to the 1.5 µm fiber-coupled laser diodes. The number of amplifier stages used in the laser system 50 may vary with the application depending on laser power requirements, with two stages shown in FIG. 2.

The hybrid fiber rod 10 of FIG. 1 may be used as part of the example laser system 50 of FIG. 2 to guide pumped light beams $26P_1$ and $26P_2$ without guiding the amplified light beam (arrow 23A). Such an approach distinguishes the hybrid fiber rod 10 from conventional fiber amplifiers in which both pumped light and amplified light are guided, as well as from bulk laser amplifiers in which neither pumped light nor amplified light is guided. Referring briefly again to FIG. 1A, within the hybrid fiber rod 10, such guiding is provided by total internal reflection at the cladding-to-cladding interface 42 between the inner and outer cladding layers 14 and 16, but not at a core-to-cladding interface 40 between the fiber core 12 and the inner cladding layer 14. Such total internal reflection at the interface 40 would occur in standard fiber amplifiers.

In order to guide the pumped light beams $26P_1$ and $26P_2$, the radii of the pumped light beams at points at which the pump beams $26P_1$, $26P_2$ enter the hybrid fiber rod 10 must be less than the radius of the cladding-to-cladding interface 42 of FIG, 1A between the adjacent inner and outer cladding layers 14 and 16. In order for total internal reflection to occur at the cladding-to-cladding interface 42 of FIG. 1A, the maximum angle of incidence of the rays of the pumped light beams 26P1 and $26P_2$ with respect to the optical axis 11 must not exceed the numerical aperture determined by interface 42. This places a restriction on both the divergence of the pumped light beams $26P_1$ and $26P_2$ and the directions of beam centroid propagation with respect to the optical axis 11 and with respect to relevant surface normals for a given configuration of the hybrid fiber rod 10, and for a given class of pump diodes to be used, and governs the choice of materials and refractive indices needed to meet the requirements presented by the pump diodes.

In laser physics, a laser beam propagating in free space may be described as Gaussian, i.e., with a beam intensity having a Gaussian profile with low divergence. The beam radius varies along the propagation direction. Single-mode beams typically have beam profiles that are approximately Gaussian. The presence of a strongly guiding interface to capture and concentrate pump radiation places significant constraints on the hybrid fiber rod 10 if the amplified laser beams (arrow 23A) are to have free-space propagation properties. The Rayleigh Range ($L_R$) of a Gaussian beam propagating in free space is the distance from the narrowest part of the beam, i.e., the beam waist, from which point the radius of the beam grows due to diffraction to $\sqrt{2}$ times the beam waist radius ($w_0$). The Rayleigh Range ($L_R$) is given by:

$$L_R = n\pi \frac{w_0^2}{\lambda}$$

where n is the refractive index of the fiber core 12, $\lambda$ is the vacuum wavelength, and $w_0$ is the beam waist radius. In order for the hybrid fiber rod 10 of FIG. 1 to not guide the amplified beam (arrow 23A), the beam must not be reflected at the interface between claddings, and thus must not have significant intensity near the high-NA interface. This puts a constraint on LR, and thus $w_0$ and d12 (diameter of the fiber core 12), for a given length of hybrid fiber rod 10.

Correspondingly, for a given core diameter d12, the requirement of having low intensity at the cladding-to-cladding interface 42 places a constraint on the length of the rod 10, namely if the Gaussian beam waist is placed halfway through the length $L_{10}$, then $L_{10}$ must be less than or on the order of $2L_R$. If instead the beam waist is at one end of the rod 10, then $L_{10}$ must be less than $L_R$. Thus, for an embodiment where $\lambda \sim 1.6$ μm, n=1.6, and $w_0 d_{12}/2$, then LR=$2\pi \times 10^6 w_0^2$. For a 300 μm diameter core (and 300 μm beam diameter $2w_0$ in the center of $L_{10}$), this gives $L_R$=0.07 m, and thus $L_{10}$<0.14 m. A conservative approach to avoiding high beam intensities near the cladding-to-cladding interface 42 might be to consider keeping the rod length at about 0.1 m.

In the hybrid fiber rod 10, the value $L_R$ is generally greater than (or at most equal to) half the length ($L_{10}$) of the hybrid fiber rod 10, i.e., $$L_R \geq \frac{L_{10}}{2},$$

so that the beam being amplified propagates all the way through the rod 10 before the wings of the beam profile encounter the cladding-to-cladding surface 42 that is guiding the pump beam. In conventional fiber amplifiers, with beam single-mode diameters the order of 10 μm, the value of the free-space equivalent $L_R$ of a mode this size would be less than 1 mm, while fiber lengths are the order of one or more meters. Thus, the beam, which would otherwise expand, is continually reflected by the core-to-cladding interface 40, and only guided propagation can take place over the fiber length $L_{10}$.

For maximum gain and efficiency in the hybrid fiber rod 10, the value of the beam waist diameter ($2w_0$) must be close to the diameter ($d_{12}$) of the fiber core 12 shown in FIG. 1 for high overlap of the laser beam with the gain medium. However, in order to remain a free-space single-mode beam, the beam diameter must everywhere be significantly smaller than the diameter of the cladding-to-cladding interface 42 of FIG. 1A, otherwise reflection at the interface of a portion of the light in the wings of the Gaussian profile will introduce interference fringes, and thus higher order mode content to the remaining beam. For the higher numerical apertures at interface 42 chosen to efficiently guide highly divergent pump beams, these moderately divergent higher modes would also be completely guided and amplified, and would remain within the beam. Thus, to minimize the contribution from this phenomena for fiber core lengths ($L_{10}$) on the order of the Rayleigh Range ($L_R$), the intensity of the Gaussian profile at the diameter $d_{14}$ of the cladding-to-cladding interface 42 is made small by making the outer diameter $d_{14} > \sim 1.5\, d_{12}$.

With regard to the diameter of the outer cladding layer 16, the actual diameter may vary with the application. The refractive index difference determines the numerical aperture (NA), $$NA = \sqrt{n_{14}^2 - n_{16}^2}$$

for total internal reflection capture of divergent pump beams. Beyond that, the thickness helps smooth out any temperature hot spots due to cooling jacket asymmetries, and provides mechanical support to permit handling and mounting. A larger diameter is stronger, and prevents pump power leakage by evanescent waves that could occur if the annulus layer of the outer cladding layer 16 is too thin. However, the temperature rise of the center of the fiber core 12, for a given average heating power per unit length, scales as $\log(\rho_{c12}/\rho_c)$, with $\rho_{c12}$ being the radius of the outer cladding layer 16 and $\rho_c$ being the radius of the inner cladding layer 14, and given good thermal contact at the outer surface. Thus, a smaller outer diameter of the outer cladding layer 16 may be somewhat better for high average power applications, especially if it is glass or some other poor thermal conductor.

Figures 3, 4:
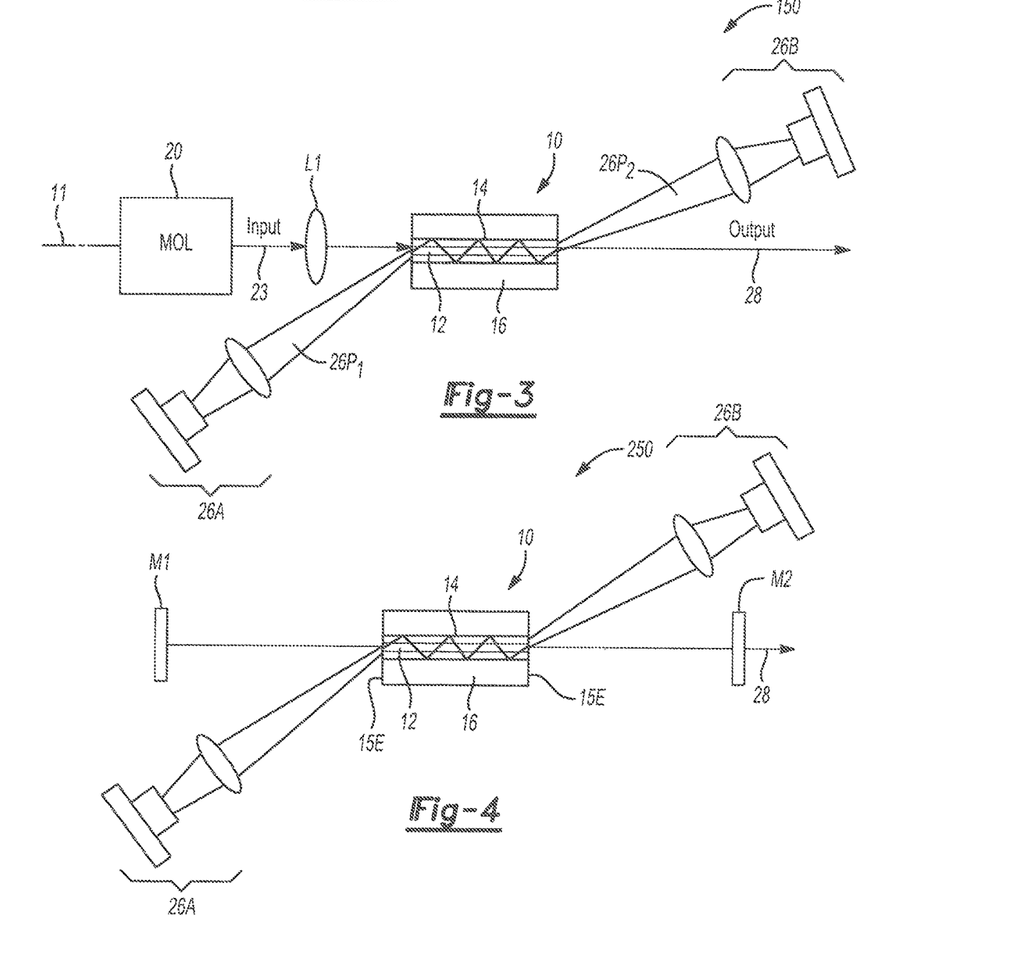
FIG. 3 is a schematic illustration of an example laser system using the hybrid fiber rod of FIG. 1 as an amplifier.
FIG. 4 is a schematic illustration of an example laser system using the hybrid fiber rod of FIG. 1 as a laser device.

FIG. 3 depicts an example of a hybrid fiber rod laser system 150 in which the hybrid laser rod 10 of FIG. 1 is used as an amplifier device. The laser system 150 includes a lens L1 disposed at or near the master oscillator device (MOL) 20 to receive the input laser beam (arrow 23). The lens L1 focuses and directs the input laser beam (arrow 23), also labeled "Input", into the hybrid fiber rod 10. The hybrid fiber rod 10 may be pumped and thus irradiated with pump laser beams 26Pi and 26P2 at opposite or distal ends 15E of the hybrid fiber rod 10 via the pump modules 26A and 26B as shown, which may be embodied as example 0.98 μm or 1.5 μm or 1.9 μm laser diodes for in-band pumping at a wavelengths close to the laser wavelength, with an output laser beam 28 (labeled "Output") of a predetermined wavelength, e.g., 1 μm, 1.5 μm, or −2 μm, respectively, being emitted along the optical axis 1L FIG. 4 depicts an example of a hybrid fiber rod laser system 250 in which the hybrid laser rod 10 of FIG. 1 is used a laser device. The laser system 250 includes first and second mirrors M1 and M2 disposed at or near opposite distal ends of the hybrid fiber rod 10, with the first mirror MI having 100 percent reflectivity and the second mirror M2 having a lower application-specific reflectivity, e.g., between 10 and 90 percent reflectivity. The mirrors M1 and M2 are shown spaced a distance apart from the hybrid fiber rod 10, but may be placed immediately adjacent to the hybrid fiber rod 10, or even derived by reflective coatings applied directly to the ends of the hybrid fiber rod 10, The hybrid fiber rod 10 may be pumped and thus irradiated with pump laser beams $26P_1$ and $26P_2$ at its opposite or distal ends 15E of the hybrid fiber rod 10 via the pump modules 26A and 26B as shown, which may be embodied as example 0.98 μm or 1.5 μm or 1.9 μm laser diodes for in-band pumping at a wavelength close to the laser wavelength, with a laser beam 28 of a predetermined wavelength, e.g., 1-2 μm, being emitted along the optical axis 11 by the second mirror M2.

Using the hybrid fiber rod 10 in the systems 50, 150, or 250 described above with reference to the Figures, the present state of the art of laser technology may be sufficiently advanced to a level necessary for supporting specialized missions of the type noted above, e.g., Earth-based atmospheric and surface monitoring, orbiting or land-based geological and atmospheric data collection, hazard avoidance and navigation of landing craft, high-speed free-space optical communication, and sensors providing spacecraft bearing, distance, and approach velocities. The present disclosure thus enables miniaturized modular packages than can be used beneficially in payload space and weight-limited environments typical of space explorations, with such benefits extending to certain Earth-based missions.

Notable challenges are present in the fabrication of the hybrid fiber rod 10 with a large core diameter and short length, such as the hybrid fiber rod 10 of FIG. 1, as stringent requirements must be met for dopant selection and concentration in the fiber core 12, low optical defects in the fiber core 12, and proper selection of the indexes of refraction of the fiber core 12, the inner cladding layer 14, and the outer cladding layer 16 as disclosed above with particular reference to FIG. 1. Any imperfections in the fiber core 12 can lead to optical damage at high peak powers or inefficient coupling of power from the pump lasers, such as the pump diodes 26A and 26B of FIG. 3 In all embodiments, total laser output power may be scaled by adding more amplifiers downstream of the modulating device 22 as the application requires.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed is:

1. A hybrid fiber rod comprising:
   a silicate fiber core doped with an active element and having a first refractive index;
   an inner cladding layer coaxial with and surrounding the fiber core, wherein the inner cladding layer has a second refractive index substantially equal to the first refractive index; and
   an outer cladding layer coaxial with and surrounding the inner cladding layer, and having a refractive index that is less than the first and second refractive indexes;
   wherein a ratio of a length of the fiber core to a diameter of the fiber core is in a range of about 30 to 2000, and the length of the fiber core is less than about twice the Rayleigh range of a Gaussian beam propagating in free space, such that degradation from single-mode to multi-mode propagation of a laser beam in the fiber core and the inner cladding layer is avoided.

2. The hybrid fiber rod of claim 1, wherein the fiber core has a length of less than or equal to about 0.5 meters (m) and a diameter in a range of about 100 micrometers (μm) to 1000 μm.

3. The hybrid fiber rod of claim 2, wherein the length of the fiber core is greater than about 0.03 m and less than 0.5 m.

4. The hybrid fiber rod of claim 3, wherein the length of the fiber core is less than about 0.1 m.

5. The hybrid fiber rod of claim 1, wherein an outer diameter of the inner cladding layer is about 150 percent of the diameter of the fiber core.

6. The hybrid fiber rod of claim 1, wherein the active element has a doping concentration of about 0.5 to 10 percent by weight of the fiber core.

7. The hybrid fiber rod of claim 6, wherein the active element having the doping concentration includes Neodymium, Erbium, Holmium, and wherein the fiber core is configured to output a single-mode laser beam having a wavelength in the range of 1 μm to 2 when irradiated by laser light from a pump laser.

8. A hybrid fiber rod laser system comprising:
   a master oscillator laser configured to generate an input laser beam along an optical axis;
   one or more modulating devices positioned along the optical axis and configured to receive and modulate a frequency, a wavelength, or an amplitude of the input laser beam, and to thereby output a modulated laser beam; and
   a hybrid fiber rod having:
      a silicate fiber core doped with an active element and having a first refractive index;
      an inner cladding layer coaxial with and surrounding the fiber core, wherein the inner cladding layer has a second refractive index that is substantially equal to the first refractive index; and
      an outer cladding layer coaxial with and surrounding the inner cladding layer, and having a refractive index that is less than the first and second refractive indexes, wherein a ratio of a length of the fiber core to a diameter of the fiber core is in a range of about 30 to 2000, and the length of the fiber core is less than about twice the Rayleigh range of a Gaussian beam propagating in free space, such that degradation from single-mode to multi-mode propagation of a laser beam in the fiber core and the inner cladding, layer is avoided; and
   at least one pump laser diode configured to energize the hybrid fiber rod from a respective distal end of the hybrid fiber rod with a calibrated wavelength of laser.

9. The laser system of claim 8, wherein the hybrid fiber rod is configured to receive and amplify the modulated laser beam.

10. The laser system of claim 8, wherein the laser system includes a plurality of the hybrid fiber rods coaxially arranged along the optical axis.

11. The laser system of claim 8, further comprising a laser resonator formed via first and second mirrors disposed at opposite distal ends of the hybrid laser rod, the first mirror having a reflectivity of about 100 percent and the second mirror having a reflectivity of less than about 90 percent.

12. The laser system of claim 8, wherein the fiber core has a length of less than about 0.1 meters (m) and a diameter that is greater than about 100 micrometers (μm) and less than about 1000 μm.

13. The laser system of claim 12, wherein the length of the fiber core is greater than about 0.03 m.

14. The laser system of claim 8, wherein an outer diameter of the inner cladding layer is about 150 percent of the diameter of the fiber core.

15. The laser system of claim 8, wherein the pair of pump laser diodes are configured to provide in-band pumping at a wavelength that is substantially equal to a laser wavelength of the hybrid fiber rod.

16. The laser system of claim 8, wherein the active element includes Neodymium, Erbium, or Holmium with a doping concentration of about 0.5 to 10 percent by weight of the fiber core.

17. The laser system of claim 8, wherein the active element includes thulium or ytterbium with a doping concentration of about 0.5 to 10 percent by weight of the fiber core.

18. A hybrid fiber rod comprising:
- a silicate fiber core doped with an active element in the form of Neodymium, Erbium, or Holmium with a doping concentration of about 0.5 to 10 percent by weight of the fiber core, the fiber core having a first refractive index, and further having a length between about 0.03 meter (m) and 0.5 m and a diameter of between about 100 micrometers (μm) and 1000 μm;
- an undoped inner cladding layer arranged coaxially with and surrounding the silicate fiber core, wherein the inner cladding layer has an outer diameter of about 130 to 200 percent of the diameter of the silicate fiber core, and a second refractive index that is substantially equal to the first refractive index; and
- an outer cladding layer arranged coaxially with and surrounding the inner cladding layer, and having a refractive index that is less than about 95 percent of the first and second refractive indexes;
- wherein the length of the fiber core is between 30 and 2000 times the diameter of the silicate fiber core, the hybrid fiber rod is configured to emit a single-mode laser beam, and the length of the fiber core is less than about twice the Rayleigh range of a Gaussian beam propagating in free space such that degradation from single-mode to multi-mode propagation of a laser beam in the fiber core arid the inner cladding layer is avoided.

19. The hybrid fiber rod of claim 18, wherein the active element is Erbium, and wherein the single-mode laser beam has a wavelength of 1.5 μm.

20. The hybrid fiber rod of claim 18, wherein the length of the fiber core is less than about 0.1 m.

* * * * *